US012657978B2

(12) United States Patent
A et al.

(10) Patent No.: US 12,657,978 B2
(45) Date of Patent: Jun. 16, 2026

(54) SYSTEM AND METHODS FOR LOCATION AWARE ACCESS

(71) Applicant: Honeywell International Inc., Charlotte, NC (US)

(72) Inventors: Ramkumar A, Madurai (IN); Sivakumar Nagarajan, Madurai (IN); Muthu Kannan Muthuvel, Madurai (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 27 days.

(21) Appl. No.: 18/757,576

(22) Filed: Jun. 28, 2024

(65) Prior Publication Data

US 2026/0004623 A1 Jan. 1, 2026

(51) Int. Cl.
*G07C 9/00* (2020.01)

(52) U.S. Cl.
CPC ................................ *G07C 9/00658* (2013.01)

(58) Field of Classification Search
CPC ........................ G07C 9/00658; G07C 9/00174
USPC ........................................................ 70/278.2
See application file for complete search history.

(56) References Cited

U.S. PATENT DOCUMENTS 8,674,832 B1 * 3/2014 Thomas .................. E05B 45/06 70/279.1
8,866,066 B2 * 10/2014 Fuse .................. G07C 9/00309 70/284
9,424,699 B2 8/2016 Kusens et al.
2022/0270421 A1 * 8/2022 Carter .................... B64U 80/25
2022/0319260 A1 * 10/2022 Carter .................... G05B 15/02
2023/0042956 A1 * 2/2023 Carter .................... B64D 47/02
2023/0154264 A1 * 5/2023 Schoenfelder ........... G07C 9/29 340/5.2
2023/0154266 A1 * 5/2023 Carter .................... G06V 20/52 340/541

OTHER PUBLICATIONS

Ma et al., Location-Aware and Safer Cards: Enhancing RFID Security and Privacy via Location Sensing, vol. 10, No. 2, Mar./Apr. 2013, pp. 57-69. https://ieeexplore.ieee.org/abstract/document/6378376/similar#similar.

(Continued)

*Primary Examiner* — Nathan Cumar
(74) *Attorney, Agent, or Firm* — Seager, Tufte & Wickhem, LLP

(57) ABSTRACT

Systems and methods for location aware access are provided. A location aware access system comprises a card reader and at least one controller. The card reader obtains access credential from a card, generates a corresponding time stamp, ascertains location coordinates representative of a geolocation of the card reader when the access credentials were received, and provides the access credentials, the time stamp, and the location coordinates to the controller. The controller is configured to receive the access credentials, the time stamp, and the location coordinates corresponding to the geolocation of the card from the card reader. Further, the controller is configured to perform authentication of the card based on the access credentials, the time stamp, and the location coordinates corresponding to the geo location of the card, and trigger an unlocking mechanism corresponding to the card reader upon successful authentication of the card.

20 Claims, 8 Drawing Sheets

(56) References Cited

OTHER PUBLICATIONS

HID Global, Smart Buildings, 11 pages. https://www.hidglobal.com/solutions/smart-buildings?Is=PPC&utm_detail=2022-pacs-apac-11-nxtgenaccess-dig-ads-adw-hidweb-ac-website-generic-PACS-APAC-EN-321&gclid=Cj0KCQiAoeGuBhCBARIsAGfKY7xzushpCSulG07WV5UlcU4f41yxqIMNJhivS0RQ7cexbaDWdRvK82MaAmINEALw_wcB&conversionMarkURL=www.hidglobal.com/solutions/access-control-systems.

Smart Card Based Access Control System using RFID via Location Sensing, International Journal of Engineering Research & Technology (IJERT), ISSN: 2278-0181, TITCON—2015 Conference Proceedin, Special Issue—2015, vol. 3, Issue 16, 4 pages. https://www.ijert.org/smart-card-based-access-control-system-using-rfid-via-location-sensing.

RFID Access Control Systems, Biometric Access Control Systems& Solutions, 4 pages. https://www.imeridian.in/biometric-access-control-system/rfid-card-access-control-systems.htm.

* cited by examiner

800

| Card ID | Access Credentials | Access Levels | Permissible Access Time Period | Permissible Geolocations |
|---|---|---|---|---|
| 1 | A123 | Level 1 | 9:00 AM - 5:00 PM | Location A |
| 2 | B456 | Level 2 | 8:00 AM - 6:00 PM | Location B, Location C |
| 3 | C789 | Level 3 | 7:00 AM - 7:00 PM | Location D |
| 4 | D012 | Level 1 | 9:00 AM - 5:00 PM | Location A, Location D |
| 5 | E345 | Level 2 | 8:00 AM - 6:00 PM | Location B |

FIG. 8

900

| Reader ID | Geolocation(s) |
|---|---|
| R001 | Location A |
| R002 | Location B |
| R003 | Location C |
| R004 | Location D |
| R005 | Location A, B, C |

FIG. 9

SYSTEM AND METHODS FOR LOCATION AWARE ACCESS

TECHNICAL FIELD OF THE INVENTION

The present subject matter relates to access systems and, more particularly, to location aware access systems for permitting access to users to an environment.

BACKGROUND OF THE INVENTION

Conventional access systems typically implement a card and a card reader-based access system to secure entry/exit to/from an environment. In such systems, when a card is presented to the card reader, the card reader performs an authentication of the card that is typically based on access credentials. Upon successful authentication, the card reader triggers permit opening or unlocking of a gate to the environment and the individual is allowed to enter or exit the environment. However, the conventional access systems are deficient at least in that an individual may maliciously enter/exit an environment where he or she is not authorized. For instance, consider a bus transportation scenario where a wireless lock is provided on a gate of the bus to facilitate entry/exit of the passengers. Herein, a passenger after purchasing an access card ticket to a destination 'D' may be permitted exit at intermediary exits 'B' or 'C' which may fall along the route to destination D. In access-sensitive environments, the ease of access to locations/destinations as explained above poses serious security risks.

SUMMARY OF THE INVENTION

The present subject matter discloses systems and methods for providing location aware access to users to environments.

In an embodiment, a location aware access system is provided. The location aware access system comprises a card reader and at least one controller. The card reader is configured to obtain access credential from a card, generate a time stamp corresponding to the obtaining of the access credentials from the card, ascertain location coordinates representative of a geolocation of the card reader when the access credentials were received, and provide the access credentials, the time stamp, and the location coordinates to the at least one controller. The at least one controller is configured to receive the access credentials, the time stamp, and the location coordinates corresponding to the geolocation of the card from the card reader. Further, the at least one controller is configured to perform authentication of the card based on the access credentials, the time stamp, and the location coordinates corresponding to the geo location of the card, and trigger an unlocking mechanism in a lock corresponding to the card reader, upon successful authentication of the card.

In some embodiments, the location aware access system further includes a storage. The storage comprises a card database that includes a plurality of records corresponding to a plurality of authorized cards, where each record comprises access credentials, permissible access time period, and a set of permissible geolocations corresponding to an authorized card. The storage further comprises a reader-location database, wherein the reader-location database comprises a plurality of geolocations corresponding to a plurality of card readers.

In some embodiments, the at least one controller may be configured to access the storage and determine the card to be an authorized card when a match for the access credentials is found in the card database. Further, the at least one controller, may determine whether the time stamp is within the permissible access time period corresponding to the authorized card. Further, the at least one controller may determine whether the geolocation corresponding to the location coordinates matches with a geolocation in the set of permissible geolocations corresponding to the authorized card. The at least one controller may determine the authentication to be successful when the time stamp is within the permissible access time period corresponding to the authorized card, and the geolocation corresponding to the location coordinates matches with a geolocation in the set of permissible geolocations corresponding to the authorized card.

In some embodiments, the at least one controller is configured to determine whether the geolocation corresponding to the location coordinates matches with a stored geolocation corresponding to the card reader. Accordingly, the at least one controller determines the authentication to be successful when the geolocation corresponding to the location coordinates matches with the stored geolocation corresponding to the card reader.

In some embodiments, the location aware access system includes at least one communication unit selected from: a GPS unit, a Wi-Fi unit, a Bluetooth unit, an RFID/NFC unit. In some embodiments, the location aware access system may determine the location coordinates using the at least one communication unit and one or more access points. In some embodiments, the location aware access system may determine the location coordinates using the at least one communication unit and a user device. In some embodiments, the location aware access system may determine the location coordinates using the at least one communication unit and GPS technology.

In some embodiments, the location aware access system may be implemented using a wireless lock, a gateway, a central server including the controller and a storage coupled therewith. In some embodiments, the location aware access system may be implemented in the wireless lock itself, where the controller and the storage are provided in the wireless lock itself.

In another embodiment, an access method implemented in a location aware access system is disclosed. The method includes, obtaining, by a card reader, access credential from a card. Further, the method includes, generating a time stamp corresponding to the obtaining of the access credentials from the card. Further, the method comprises, ascertaining location coordinates representative of a geolocation of the card reader when the access credentials were received. The method further comprises, performing, by at least one controller, an authentication of the card based on the access credentials, the time stamp, and the location coordinates corresponding to the geolocation of the card. Further, the method comprises triggering an unlocking mechanism corresponding to the card reader upon successful authentication of the card.

In yet another embodiment, a computer-readable medium having computer-executable instructions stored thereon is disclosed. The computer-executable instructions, when executed by a processing system, cause the processing system to obtain, using a card reader, access credential from a card. Further, the computer-executable instructions cause the processing system to generate a time stamp corresponding to the obtaining of the access credentials from the card. The computer-executable instructions further cause the processing system to ascertain location coordinates representative of a geolocation of the card reader when the access credentials were received. Further, the computer-executable instructions cause the processing system to perform, using at least one controller, an authentication of the card based on the access credentials, the time stamp, and the location coordinates corresponding to the geolocation of the card. Furthermore, the computer-executable instructions cause the processing system to trigger an unlocking mechanism corresponding to the card reader upon successful authentication of the card.

The location aware access systems and methods of the present subject matter provide for enhanced security in environments. The integration of location information in authenticating access to environments provides additional layers of security check and facilitates mechanisms for ensuring security of access to environments.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF DRAWINGS

Embodiments of the subject matter will hereinafter be described in conjunction with the following drawing figures, wherein like numerals denote like elements, and:

FIG. 8 illustrates an exemplary card database, according to one or more embodiments of the present disclosure; and FIG. 9 illustrates an exemplary reader-location database, according to one or more embodiments of the present disclosure.

Figure 1:
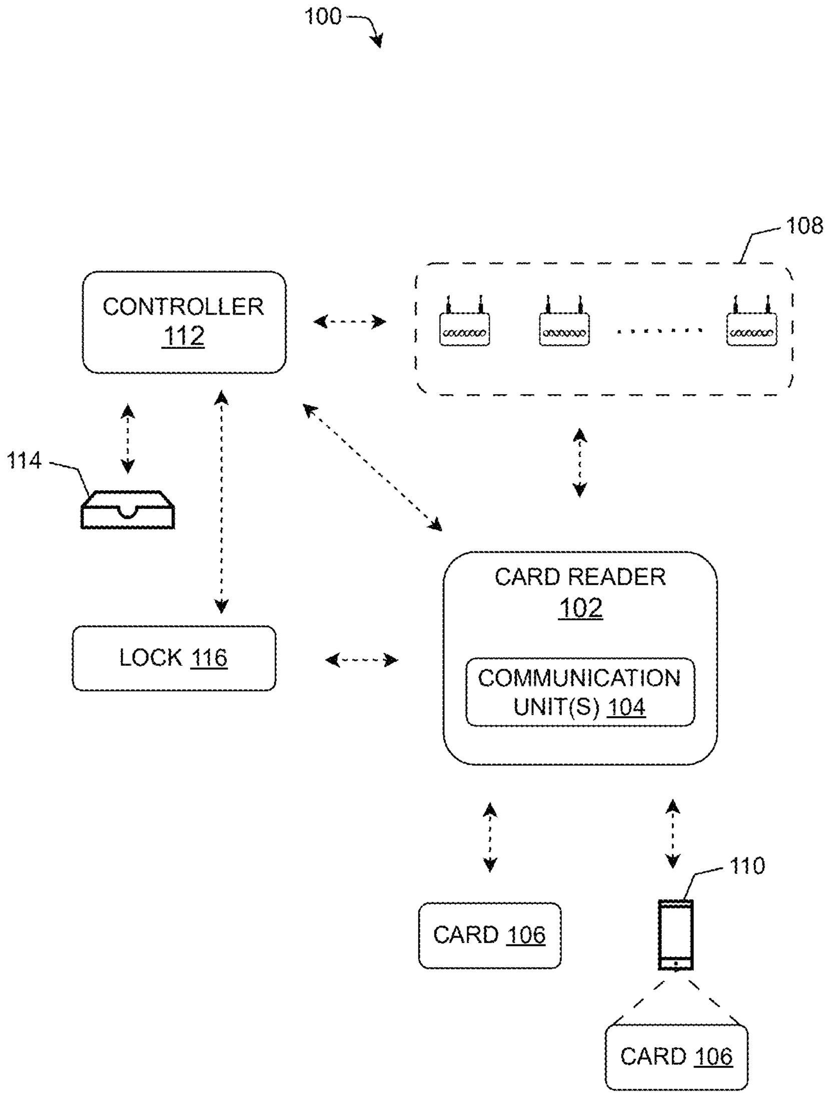
FIG. 1 is a schematic block diagram of an illustrative location aware access system, according to one or more embodiments of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF INVENTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative location aware access system 100, hereinafter interchangeably referred to as "the access system 100" or "the system 100", for permitting access to or exit from environments to individuals/users. The system 100 may be implemented in environments, such as buildings, offices, warehouses, facilities, and campuses. In some examples, the system 100 may be implemented in transportation vehicles, such as buses, metro, trains, and freight containers. In some examples, the system 100 may be implemented in a combination of the aforementioned, say, for example, in a bus plying in a campus.

The system 100 may include a card reader 102. In some embodiments, the card reader 102 (interchangeably "the reader 102") may include one or more communication units 104, such as a GPS module, a Bluetooth module, an NFC module, an RFID module, an RF antenna, an RF transceiver, an RFID controller, a magnetic read head, NFC/RFID reader, and a Wi-Fi module. The communication units 104 enable the reader 102 to communicate with or receive communication from other entities, such as, but not limited to, access cards, computing devices, access points, electronic devices, and GPS satellites. For instance, in an example, the reader 102 may obtain data, such as access credentials, stored on a card 106 using the NFC module. In another example, the reader 102 may obtain data from the card 106 using the RFID module. In yet another example, the reader 102 may obtain data from the card 106 using the magnetic head.

In some embodiments, the reader 102 may obtain the access credentials from the card 106 when the card 106 is within a predetermined distance from the reader 102. For instance, the reader 102 may be configured to authenticate the card 106 only when it is within a range of five centimeters, ensuring that only cards in close proximity are validated. In another example, the predetermined distance may be set to ten centimeters, allowing the reader 102 to capture the credentials from the card 106 without requiring physical contact. Additionally, the reader 102 might be programmed to reject access if the card 106 is detected beyond a threshold of twenty centimeters, thus enhancing the security by limiting the effective range of credential acquisition.

In some embodiments, the card 106 may be a digital card which may be stored in a mobile device, such as the mobile device 110. Herein, the reader 102 may obtain the data from the card 106 using one of the RFID, the NFC, the Bluetooth, and the Wi-Fi module. As would be appreciated, one or more of the aforementioned techniques for obtaining data from the card 106 may be implemented in the reader 102 based on the implementation. For example, the reader 102 may employ NFC technology to establish a secure communication channel with the card 106 when the mobile device 110 is brought within a few centimeters of the reader 102, enabling quick and seamless access. Alternatively, the reader 102 could utilize Bluetooth to connect with the card 106 stored in the mobile device 110 when it comes within a predetermined range, such as ten meters, facilitating access without the need for precise positioning. In another scenario, the reader 102 may leverage Wi-Fi to obtain the data from the card 106, allowing for credential verification over a more extended range, which could be particularly useful in environments requiring more flexible access points.

In some embodiments, the reader 102 may generate a timestamp associated with the obtaining of the data from the card 106. For example, the timestamp may be recorded in an access log, providing a precise record of when the card 106 was read by the reader 102. The access credentials and the timestamp associated therewith may be utilized for authentication of a user and for subsequent access/exit grant to an environment to the user, as would be explained in detail below.

On receiving the access credentials, the reader 102 may ascertain location coordinates representative of a geolocation of the reader 102 using the communication units 104. For instance, in an example, the reader 102 may determine the location coordinates using the signals received by the GPS module. The GPS module may receive signals from multiple satellites and accordingly triangulate the reader 102's position to provide accurate location data. The reader 102 may utilize the GPS module in outdoor environments where satellite signals are readily accessible, thereby ensuring precise geolocation tracking of access events.

In another example, the reader 102 may determine the location coordinates using the Wi-Fi module. In said example, the Wi-Fi module may perform a scan for detecting and/or subsequently connecting with one or more access points 108, such as a gateway. The reader 102 may identify a gateway having the maximum signal strength, which indicates closest proximity to the reader 102. By analyzing the signal strengths and known locations of the Wi-Fi access points, the reader 102 may determine its own position. In an example, the reader 102 may utilize the Wi-Fi module in indoor environments or areas where GPS signals may be weak or obstructed, providing an alternative means to ascertain accurate location coordinates.

In yet another example, the reader 102 may interact with a mobile device 110 of a user using one of the RFID module, the NFC module, the Bluetooth module, and the Wi-Fi module for determining the location coordinates. Examples of the mobile device 110 may include, but are not limited to, a smartphone, a tablet, a laptop, and a smartwatch, a smart ring. Herein, the reader 102 may request the mobile device 110 for providing data associated with a location of the mobile device 110. The mobile device 110 accordingly may implement any of known location determination techniques, determine its location, and provide the same as location data to the reader 102. For instance, when the mobile device 110 uses GPS, it calculates its position by receiving satellite signals and then transmits these coordinates to the reader 102. This is particularly effective in outdoor environments where GPS signal availability is optimal. Alternatively, the mobile device 110 might use Wi-Fi triangulation by scanning for nearby Wi-Fi access points and determining its location based on the known positions of these access points and the strength of their signals. This technique is especially useful in indoor settings where GPS signals may be weak or unavailable. In some examples, a smartwatch or a smart ring might use NFC for close-range communication with the reader 102, providing a quick and seamless way to transmit location data when the user is in close proximity. On the other hand, a laptop might use Wi-Fi or Bluetooth to provide location data.

In some example, the reader 102 may interact with the mobile device 110 for ascertaining the location coordinates when the card 106 is a digital card stored on the mobile device 110. In some examples, the reader 102 may interact with the mobile device 110 for ascertaining the location coordinates when the card 106 is a physical card and the reader 102 may not have adequate signal reception at its communication units, such as the GPS module or the Wi-Fi unit. In some further examples, the reader 102 may interact with the mobile device 110 for ascertaining the location coordinates in order to verify the location coordinates ascertained by the reader 102. Herein, the reader 102 may compare the location coordinates received in the location data from the mobile device 110 with the location coordinates determined by the reader 102 using the communication unit 104, such as the GPS module or the Wi-Fi module. In some example, the location coordinates may be accordingly updated for increasing accuracy thereof, based on the aforementioned verification.

In some embodiments, the reader 102 may provide the access credentials, the time stamp, and the location coordinates corresponding to the geolocation of the reader 102 to a controller 112. In an example, the reader 102 may be communicatively coupled to the controller 112 and accordingly, may transmit a message comprising the aforementioned data, i.e., the access credentials, the time stamp, and the location coordinates corresponding to the geolocation of the reader 102, to the controller 112. In some embodiments, the reader 102 may be directly connected to the controller 112, for instance, when the system 100 is realized as a wireless lock or when the system is realized in a card reader that may be coupled to a wireless lock. In another example, the reader be connected to the controller 112 using one or more of the access points 108, or through other communication channels, for instance when the system 100 is implemented in a distributed manner. Herein, the controller 112 may be implemented in a server or central station, for example, in a facility or enterprise building. The controller 112 may be operatively coupled to one or more of the readers 102 which may be implemented in wireless locks or locks in such a facility. As would be appreciated, the wireless locks or locks may control a gate or any other restrictive mechanism for controlling access/exit of individuals.

The controller 112, in some examples, may be implemented or realized as general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In some examples, the controller 112 may be realized as microprocessors, controllers, microcontrollers, or state machines. In some examples, the controller 112 may be realized as a combination of computing devices, such as, a combination of digital signal processors and microprocessors, a plurality of microprocessors, one or more microprocessors in conjunction with a digital signal processor core, or any other such combination/configuration. In some embodiments, a controller, such as the controller 112 or equivalents thereof, may be provided in the card reader 102 for performing operations thereof, as described herein.

The controller 112 may receive the access credentials, the time stamp, and the location coordinates corresponding to the geolocation of the reader 102, from the reader 102. In some embodiments, the controller 112 may perform an authentication of the card based on the aforementioned received information from the reader 102. For performing the authentication, the controller 112 may access a storage 114 that is communicatively coupled with the controller 112.

In some examples, the storage 114 may be provided as a storage element in the distributed implementation. Herein, the storage 114 may be provided within or external to the central server or station. In some embodiments, the storage 114 may be provided within the wireless lock or the card reader, based on the implementation. In such implementation, the wireless lock or the card reader may be communicatively coupled to a central station via which the data may be stored in or retrieved from the storage 114. In another implementation, a user device, such as a laptop or a smartphone may be communicatively coupled with the wireless lock or the card reader for updating the data in the storage 114.

The storage 114 may include one or more databases, such as a card database and a reader location database. In some examples, an implementor of the system 100 may register users and may issue access cards to the users. The registration of a user may include defining access credentials and access levels for the user. Further, the registration may include defining permissible access time period and a set of permissible geolocations for the user. On registration, an access card is issued to the user and a corresponding record is created in the card database. The record includes the aforementioned details, i.e., the access credentials, the access levels for the user, the permissible access time period, and the set of permissible geolocations for the user. Furthermore, as may be understood, the record is in a mapped relationship with the access card issued to the user. Accordingly, the access card may include the access credentials of the user stored thereon or linked thereto. In some examples, the card may be a digital card, such as a mobile key, and may be issued to a registered user device, such as the mobile device 110, of the user. As an example, an amusement park administrator may require registration of users. The user may select an entry plan which helps define the access level, access time period, and a set of locations within the amusement park that are accessible to the user as per the selected plan. The aforementioned details along with the access credentials of the user may be stored in a card database implemented by the amusement park administrator. Herein, the access card issued to the user, i.e., the amusement park visitor, may be mapped to the aforementioned record and may include the access credentials of the visitor thereon or linked thereto.

In some example, the implementor of the system 100 may implement one or more readers, such as the readers 102. For instance, in the above example of amusement park, a plurality of readers may be implemented in entry to various sections of the park, on entry gates to the rides, on internal transport buses operating within the park. In an example, for each of the readers 102, the corresponding geolocations at which they are implemented may be stored in the storage 114, for example, in the reader location database. In some examples, a reader may have only one corresponding geolocation. For instance, a reader that is implemented in a server room of a facility may have only one geolocation corresponding thereto. In some examples, a plurality of geolocations may be defined for a reader. For instance, a reader that is installed in a bus operating within the amusement park may have multiple geolocations associated therewith and these geolocations may be stored in the reader location database in the storage 114.

As mentioned above, the controller 112 may perform an authentication of the card based on the access credentials, the time stamp, and the location coordinates corresponding to the geolocation of the reader 102, received from the reader 102. In the authentication operation, the controller 112 may access the card database in the storage 114 and run a query to look for a match for the access credentials in the card database. In a case where a record with matching access credential is found, the card is determined as an authorized card.

Once the card is determined as an authorized card, in some examples, the controller 112 may subsequently make a determination as to whether the received timestamp is within the permissible access time period. In case the timestamp at which the access credentials were received at the reader 102 is within the permissible access time period, it is determined that the user is seeking access during permissible time period. For example, consider a scenario where an employee, employee A, has an authorized access card for entering his office building. The predefined access time period for employee A's card is set between 8:00 AM and 6:00 PM on weekdays. In said example, the employee A presents his card to the reader 102 at 8:30 AM on a Monday. Upon receiving the access credentials, the controller 112 verifies that Employee A's card is indeed authorized by finding a matching record in the card database stored in the storage 114.

The controller 112 checks the timestamp associated with employee A's access attempt. The timestamp recorded by the reader 102 is 8:30 AM. The controller 112 compares this timestamp against the predefined access time period for employee A's card. Since 8:30 AM falls within the allowed access window of 8:00 AM to 6:00 PM, the controller 112 determines that employee A is seeking access during an authorized time. Consequently, the system 100 permits employee A's entry into the building.

If, however, employee A attempted to access the building at 7:00 PM, the controller 112 would compare the timestamp with the predefined access period and determine that 7:00 PM is outside the authorized access time. In this case, the controller 112 would deny access, ensuring that employee A cannot enter the building outside of his permitted hours.

Furthermore, in some examples, the controller 112 may utilize the reader 102's geolocation at which the access credentials were received for determining whether the user is attempting access/exit at a permitted geolocation. Herein, the controller 112 may determine whether the received geolocation matches with a geolocation in the set of permissible geolocations corresponding to the authorized card. If the controller 112 determines that the geolocation matches with a geolocation in the set of permissible geolocations corresponding to the authorized card, the controller 112 may determine that the user is attempting access/exit at a permitted geolocation.

Consider an example of a large enterprise campus with multiple entry points secured by the system 100. Each employee of the enterprise may be issued an access card encoded with specific credentials mapped to their authorized areas within the campus. The controller 112 may operationally manage these access points. In an example, when an employee presents their access card at a reader, such as the reader 102, located at Entrance A, the controller 112 may receive the geolocation data along with the access credentials and timestamp, from the reader 102. In this scenario, if the employee's access credentials are validated against the card database stored in storage 114, the controller 112 verifies the access/exit attempt based on permissible time period and geolocations In reference to the geolocations, the controller 112 cross-references the received geolocation with a predefined set of permissible geolocations associated with the employee. If the geolocation captured at Entrance A matches any of the approved locations for that employee, as stored in the database, the controller 112 confirms that the access attempt is legitimate and within authorized parameters.

In some embodiments, the controller 112 may make a further enquiry to determine whether the reader 102 is at a permitted geolocation or not, when the access credentials were received. Herein, the controller 112 may be configured to access the reader-location database and determine whether the reader 102's received geolocation matches with a stored geolocation corresponding to the reader 102 in the reader-location database. In case of a successful match, the controller 112 determines the authentication to be successful.

As an example, a card reader A may be installed at a doorway to a room A of a facility. Accordingly, a geolocation of the room A is stored in a mapped relationship with the card reader A in the reader-location database in the storage 11. Now, in case an authorized card is used to access the room A within the permissible access time period by presenting the card to the card reader A present at the room A doorway, the controller 112 would determine a successful authentication. Now consider that the card reader A is maliciously re-installed at a doorway of room B which is in a geolocation separate to that of room A. In such a case, when an authorized card is used at the card reader A at room B within permissible time limit, the controller 112 may determine that the geolocation of the card reader A is not matching with any of the stored geolocations for the card reader A in the reader-location database. Accordingly, the controller 112 may deem the authentication for the card as unsuccessful. Thus, in the aforesaid implementation, security against malicious attempts to gain access to environments by re-installing card readers is ensured.

In some embodiments, after the authentication of the card is deemed successful, the controller 112 may trigger an unlocking mechanism in a lock 116 corresponding to the reader 102. The term lock, as used herein and without limitation, may be a door lock of a room in a facility, a gating mechanism lock of a sliding door or stationary door, a toll booth lock, a vehicle door lock, a lock installed at a passageway door, a wireless lock, etc. As would be appreciated, the term lock may include or additionally be coupled to unlocking mechanism based on the implementation.

In some embodiments, the system 100 may be implemented in a distributed manner. For instance, the card reader 102 and the communication units 104 may be provided within the lock 116. In another implementation, the lock 116 may be installed separate to the card reader 102, and they may together form a locking unit that is implemented to facilitate entry/exit from an environment. In the aforementioned examples, obtained access credentials, corresponding timestamp, and the ascertained geolocation of the reader 102, may be communicated to the controller 112, which may be realized in a central server or a cloud server. The communication to the controller 112, in some examples, may include routing the communication through one or more of the access points 108.

In an example of distributed manner implementation, a wireless door lock may be implemented in a bus operating in a campus of an enterprise. The wireless door lock may include the card reader 102 and one or more of the communication units 104, or the reader 102 and the communication units 104 may be installed separate to the wireless door lock, in vicinity to each other at a gate of the bus to serve the function of controlling access/exit from the bus. The controller 112 and the storage 114 may be implemented in a central server or a remote server, and communication therewith may be performed directly or using the access points 108.

In an example, a plurality of employees of the enterprise may have corresponding access levels, access credentials, defined geolocations accessible to them, and so on and so forth, stored in the storage 114. In transportation across the campus, an authentication of a card presented by an employee may be performed by the wireless door lock, on the basis of access credentials, timestamp, and the geolocation of the reader 102. The aforesaid data is sent to the controller 112 by the card reader 102 using the communication unit 104. Accordingly, if successfully authenticated, the wireless door lock is triggered open by the controller and the employee is permitted to deboard the bus at a geolocation within the campus. In case during authentication it is determined that the card is used by the employee to attempt deboarding of the bus at an unauthorized geolocation, the authorization is deemed unsuccessful by the controller 112 and the wireless door lock remains closed, and the bus door is not opened for deboarding.

In some embodiments, the system 100 may be realized in a lock, such as a wireless access lock, where the reader 102, the communication units 104, the controller 112, and the storage 114 are implemented within the lock itself. The lock may be the lock 116, in an example. The lock 116 may be configured with the capability to obtain access credentials from a card and subsequently perform the authentication of the card in entirety at the lock 116 itself, as per the aspects described above. Accordingly, on successful authentication, the user may be permitted to enter/exit the environment. A further detailed illustration and explanation is provided below with regard to FIG. 2.

Figure 2:
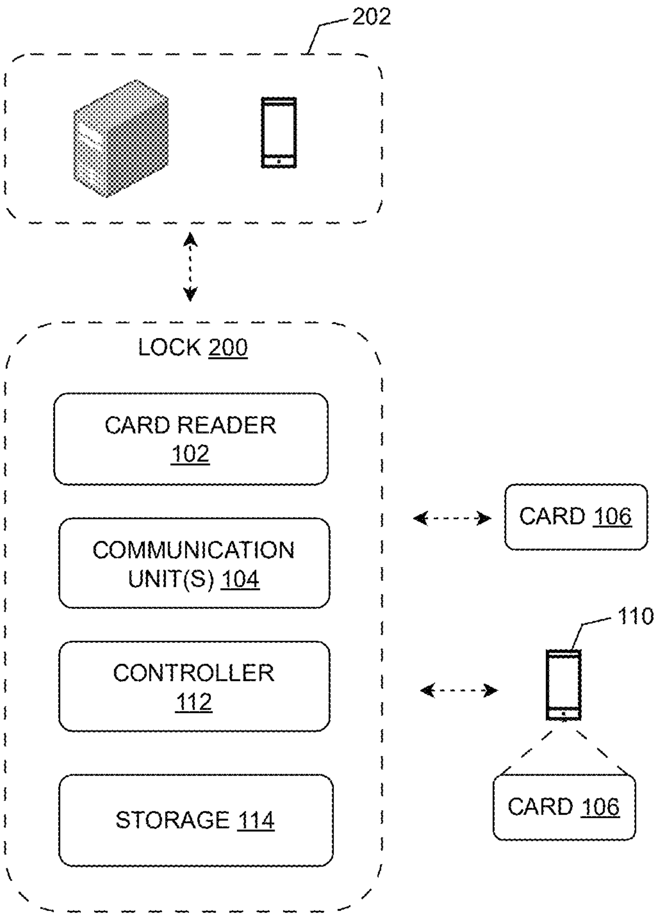
FIG. 2 is a schematic block diagram of the location aware access system, according to one or more embodiments of the present disclosure.

FIG. 2 is a schematic block diagram of the system 100 for permitting access to or exit from environments to users. In an example embodiment, the system 100 may be realized as a lock 200. Without limitation, the term "lock" may be understood as a single unit or apparatus, or a combination of multiple units or apparatuses that secure access to or exit from an environment, such as a facility, room, section of a facility, vehicle, etc. The lock 200 may include the card reader 102, the communication unit(s) 104, the controller 112, and the storage 114, in one example.

In said example embodiment, the lock 200 may be configured with the capability to obtain access credentials from a card and subsequently perform the authentication of the card in entirety at the lock 200 itself. For instance, the card reader 102 in the lock 200 may obtain access credentials from the card 106 when the card 106 is presented within the predetermined distance from the lock 200. The card reader 102 may utilize one of the NFC module, the RFID module, the Bluetooth module, or the Wi-Fi module for obtaining the access credentials, in some examples.

The access credentials, in an example, may include a card ID or a login ID or an employee ID the user seeking access/exit from the environment. For authorized users, the access credentials may be stored in a mapped relationship with authorized cards in the card database in the lock 200. Thus, the access credentials obtained by the reader 102 of the lock 200 are used for authenticating the card using the card database. Accordingly, the user may be permitted access/exit from the environment.

In some examples, the predetermined distance may be configurable by an administrator, in some examples. Furthermore, the predetermined distance may be different for different technologies being implemented by the reader 102 for obtaining the access credentials. For instance, in case the NFC technique is being used, then the predetermined may be short, say, less than five centimetre. In other example, where Bluetooth example is used, the predetermined distance may be 1-5 meters.

After receiving the access credentials, the lock 200 may generate the timestamp corresponding to the instant at which the access credentials were received by the reader 102. The system 100 implemented in the lock 200 may include a clock circuitry (not shown) which may be utilized for timestamp generation. For instance, at the instant when the access credentials were received at the reader 102, the reader 102 may note the time and may generate the timestamp corresponding to the receiving of the access credentials.

Furthermore, the lock 200 may ascertain the geolocation of the reader 102 at the instant when the access credentials were received. Particularly, the lock 200 may ascertain the location coordinates which represent the geolocation of the card reader 102 when the access credentials were received. In an example, the lock 200 may trigger the GPS module for ascertaining the location coordinates. The GPS module makes use of the signals received from one or more GPS satellites and may accordingly determine the location coordinates of the reader 102. The corresponding geolocation is noted as the geolocation of the reader 102 by the lock 200.

In another example, the lock 200 may utilize the W-Fi module for ascertaining the geolocation. Herein, the lock 200 may trigger a Wi-Fi scan using the Wi-Fi module for detecting one or more access points, such as the access points 108. Based on the scan, the lock 200 may identify one or more access points that are in proximity to the lock 200. The determination of the proximity may be made, for example, based on the connection strength of the signal received from these one or more access points at the Wi-Fi module. In an example, the access point with the maximum connection strength may be selected and the lock 200 may determine the location of the selected access point from an internal database which has information about access points and their locations stored therein. Accordingly, the location of the access point is ascertained to be the geolocation of the reader 102 at the instant when the access credentials were received.

In an example, the lock 200 may ascertain the geolocation of the reader 102 using a user device of the user who presented the card. Herein, the lock 200 may communicate with the user device using Bluetooth or Wi-Fi and may send a location request to the user device. The user device may implement any known technique and may accordingly determine the location at which the user device is present. Since the user device is in proximity to the reader 102, the location of the user device may serve as the geolocation of the reader 102 in this example. Once the user device determines the location, the user device may communicate a location response back to the lock 200. The reader 102 in the lock 200 may process the location response and accordingly identify the location specified therein. The identified location is then ascertained as the geolocation of the reader 102 at the instant when the access credentials were received from the card 106.

The lock 200 may utilize the services of the user device for determination of the geolocation of the reader 102 in various implementations. For instance, the lock 200 may utilize the services of the user device in a case where the card 106 is a digital card and is stored on the user device, where the user device was presented for seeking the entry/exit. In another case, the lock 200 may utilize the services of the user device for ascertaining the location of the reader 102, even if the physical card was used. Herein, the lock 200 may request the user device for the location in instances where, the lock 200 is itself not able to determine the location, for instance, due to poor connections. In yet another case, the lock 200 may ascertain the location coordinates, i.e., the geolocation of the reader 102 at its own end using the communication unit 104, as explained above. However, in order to verify the ascertaining or enhance the accuracy of ascertaining the geolocation of the reader 102, the lock 200 may request the user device for providing the location information. Herein, upon receiving the location information from the user device, the lock 200 may compare the received location information with the geolocation detected by the lock 200 using the communication unit 104. In case the location information matches the detected geolocation, the geolocation is verified. In case of mismatch, the lock 200 may then perform subsequent location check using other technologies, such as using the GPS module of the lock 200, etc, or requesting another nearby device for location information.

The lock 200 may subsequently perform an authentication of the card based on the access credentials, the corresponding timestamp, and the location coordinates, as described above in FIG. 1, where all the operations pertaining to the authentication are performed within the lock 200. Accordingly, in case of a successful authentication, the lock 200 is unlocked and the user is allowed to enter/exit the environment.

An example implementation may include implementation of a wireless door lock, such as the lock 200, in a bus operating in a campus of an enterprise. In said implementation, the data, such as access credentials, permissible access time periods, permitted geolocations, etc. might be stored in databases that are stored in a storage within the lock 200. The campus may include several locations, say, A to D, and a user A might be authorized to access only location A. In some examples, when the user is being transported in the bus in the campus and attempts deboarding at the location A, the user A would be successfully authenticated by the lock 200 on presentation of an authorized card within permissible access time period as the user is permitted access to location A. However, when the user is being transported in the bus in the campus and attempts deboarding at the location B or C or D by presenting the authorized card, then the lock 200 would deem the authentication of the user A as unsuccessful. Herein, although the user A would have the authorized card and may present the card during permissible time limit, however, since the user A is not having permission to access locations B, C, or D, the lock 200 would deny deboarding opportunity to the user A at these aforementioned locations.

Accordingly, in transportation across the campus premises, an authentication of a card presented by an employee may be performed on the basis of access credentials, timestamp, and the geolocation, by implementing the aspects described above. Accordingly, if successfully authenticated, the employee is permitted to deboard the bus at a geolocation within the campus. In case during authentication it is determined that the card is used by the employee to attempt deboarding of the bus at an unauthorized geolocation, the authorization is deemed unsuccessful by the wireless door lock and the bus door is not opened for deboarding.

In some embodiments, the lock 200 may be communicatively coupled to a computing device 202, that may be an administrator device entrusted with permissions for accessing and updating the storage 114, re-programing the controller 112, and configuring other components and functions of the lock 200. In an example, the computing device 202 may be a central server installed in a facility of the implementor. In another implementation, the central server may be a remote server. In another example, the computing device 202 may be a tablet or a smartphone or a laptop, having the aforementioned capabilities.

Figure 3:
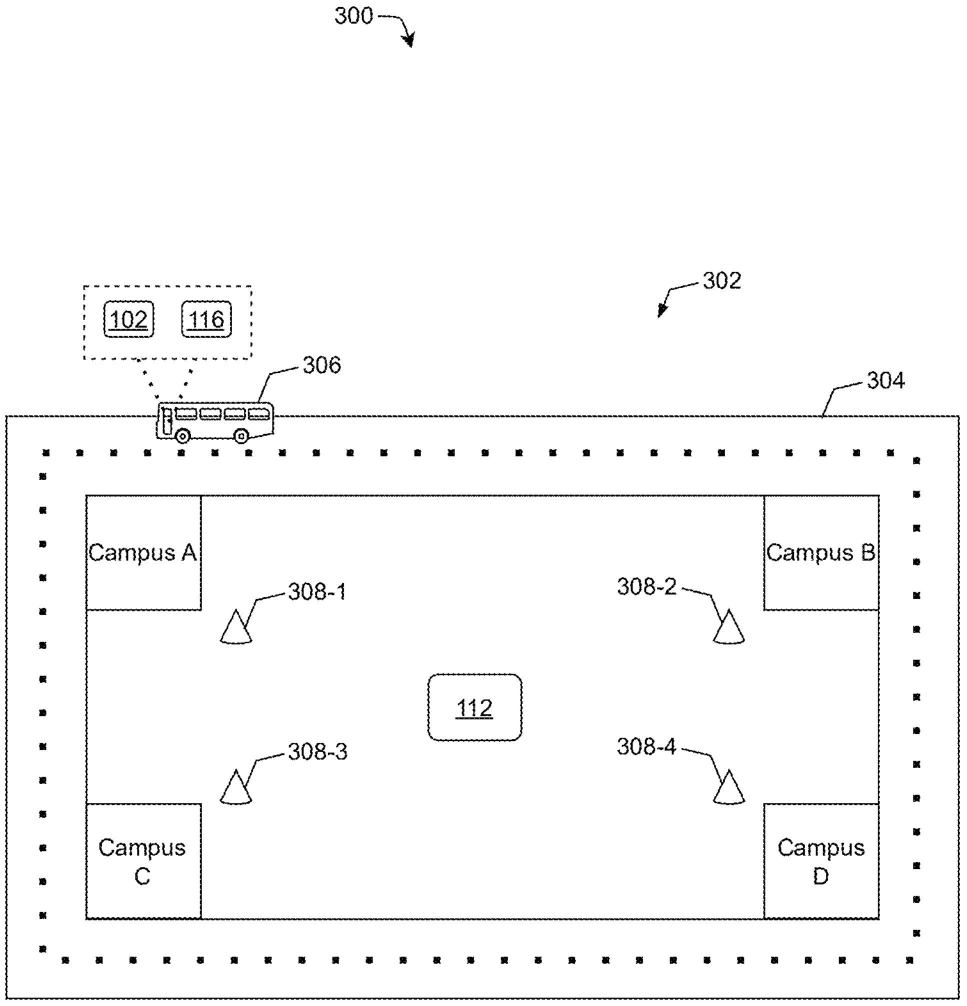
FIG. 3 illustrates a use case depicting implementation of the location aware access system, according to one or more embodiments of the present disclosure.

FIG. 3 illustrates a use case 300 depicting implementation of the system 100, according to some embodiments of the present disclosure. The use case 300 illustrates an environment which includes a campus 302, a plurality of campuses A-D, a road 304, a bus 306 plying on the road 304 covering, and a plurality of access points 308-1 to 308-4 installed corresponding to the campuses A-D, respectively. In an example, the system 100 may be implemented in the campus 302 for ensuring security of access to campuses A-D to authorized personnel only. Accordingly, in order to ensure that a personnel boards and deboards the bus at permitted locations within the campus 302, the lock 116 may be provided in the bus 306 along with the reader 102, either separately or as a single unit, at a door of the bus 306. Furthermore, the controller 112 may be deployed in a central server or a cloud server (not shown in the figure).

Referring to the use case 300, a case of successful authentication is explained herein. In an example, a user A who is authorized personnel of the campus 302 may be authorized to board and de-board the bus 306 from campuses A and C, anytime during 9:00 AM to 6:00 PM. In a scenario, the user A may wish to deboard the bus 306 at campus A at 9:30 AM, and may present an access card issued to him at the reader 102. The access card may be a physical card or a digital card, in some examples.

On detecting the card in the predetermined distance, the reader 102 may obtain the access credentials, generate the timestamp, and ascertain the geolocation of the reader 102 at the instant when the card was presented by the user A. According to aspects of the present disclosure, the geolocation may be determined based on the location coordinates that may be determined using a GPS module, or a Wi-Fi module, or through other communication modules, as explained in detail in FIG. 1. This information is then sent to the controller 112 in the central server, for example, using the access point 308-1.

The controller 112 determines that the access credential match a record in the card database, the access time is within the permissible time period, and the geolocation is found in a set of permissible geolocations for the user A. Accordingly, the controller 112 may determine the authentication to be successful and may trigger the unlocking of the lock 116, for example, by sending a corresponding signal to the lock 116 through the access point 308-1. Accordingly, the user A is able to deboard the bus 306 at the campus A.

Figure 4:
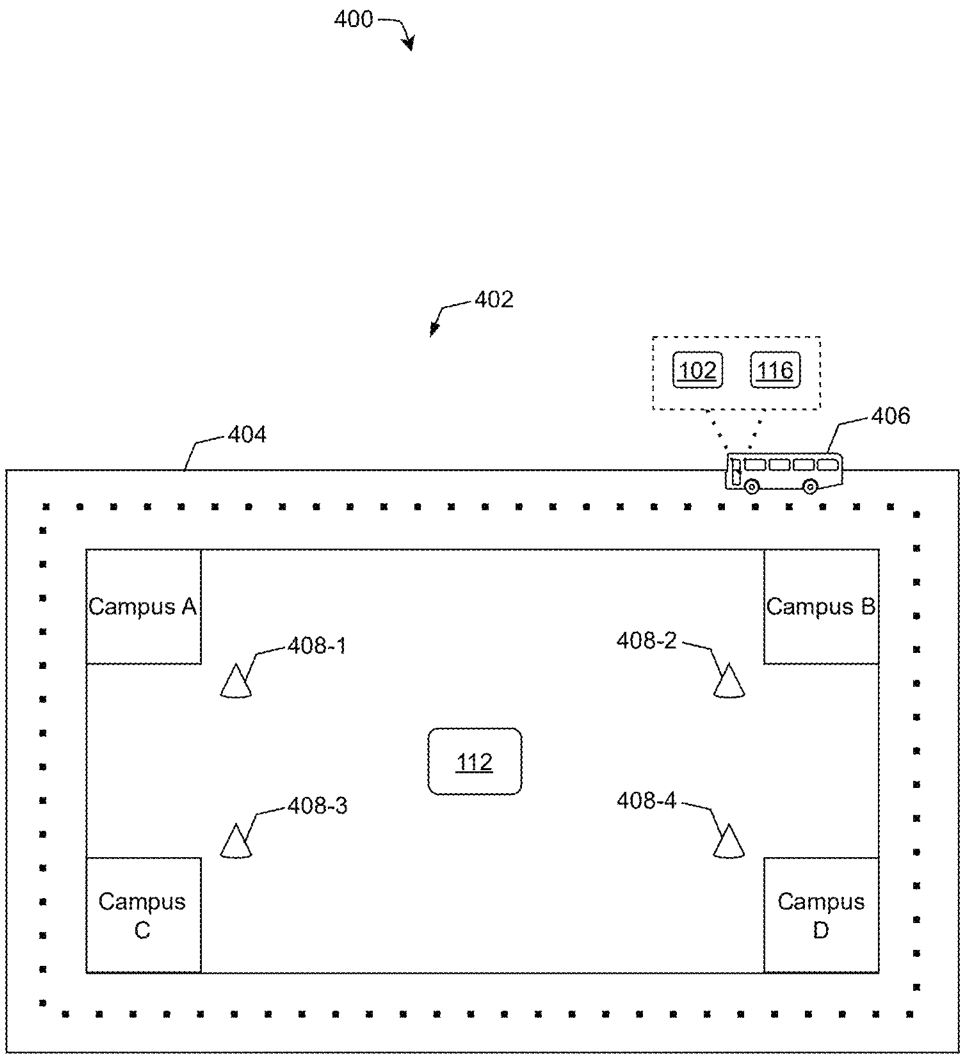
FIG. 4 illustrates a use case depicting implementation of the location aware access system, according to one or more embodiments of the present disclosure.

FIG. 4 illustrates a use case 400 depicting implementation of the system 100, according to some embodiments of the present disclosure. The use case 400 illustrates an environment which includes a campus 402, a plurality of campuses A-D, a road 404, a bus 406 plying on the road 404 covering, and a plurality of access points 408-1 to 408-4 installed corresponding to the campuses A-D, respectively. In an example, the system 100 may be implemented in the campus 402 for ensuring security of access to campuses A-D to authorized personnel only. Accordingly, in order to ensure that a personnel boards and deboards the bus at permitted locations within the campus 402, the lock 116 may be provided in the bus 406 along with the reader 102, either separately or as a single unit, at a door of the bus 406. Furthermore, the controller 112 may be deployed in a central server or a cloud server (not shown in the figure).

Referring to the use case 400, a case of unsuccessful authentication is explained herein. In an example, a user A who is authorized personnel of the campus 402 may be authorized to board and de-board the bus 406 from campuses A and C, anytime during 9:00 AM to 6:00 PM. In a scenario, the user A may attempt to deboard the bus 406 at campus B at 9:30 AM, and may present an access card issued to him at the reader 102. The access card may be a physical card or a digital card, in some examples.

On detecting the card in the predetermined distance, the reader 102 may obtain the access credentials, generate the timestamp, and ascertain the geolocation of the reader 102 at the instant when the card was presented by the user A. According to aspects of the present disclosure, the geolocation may be determined based on the location coordinates that may be determined using a GPS module, or a Wi-Fi module, or through other communication modules, as explained in detail in FIG. 1. This information is then sent to the controller 112 in the central server, for example, using the access point 408-2.

The controller 112 determines that the access credential match a record in the card database and the access time is within the permissible time period. However, the controller 112 may determine that the geolocation of the user A is campus B, and the same is not found to be matching the set of permissible geolocations, i.e., campus A and C, for the user A. Accordingly, the controller 112 may determine the authentication to be unsuccessful because of the geolocation mismatch, and may trigger an error signal to the lock 116, for example, by sending a corresponding signal to the lock 116 through the access point 408-2. Accordingly, a voice or a visual display representing unsuccessful authorization may be provided to the user A, and the deboarding of the user A at a restricted geolocation is prevented.

Figure 5:
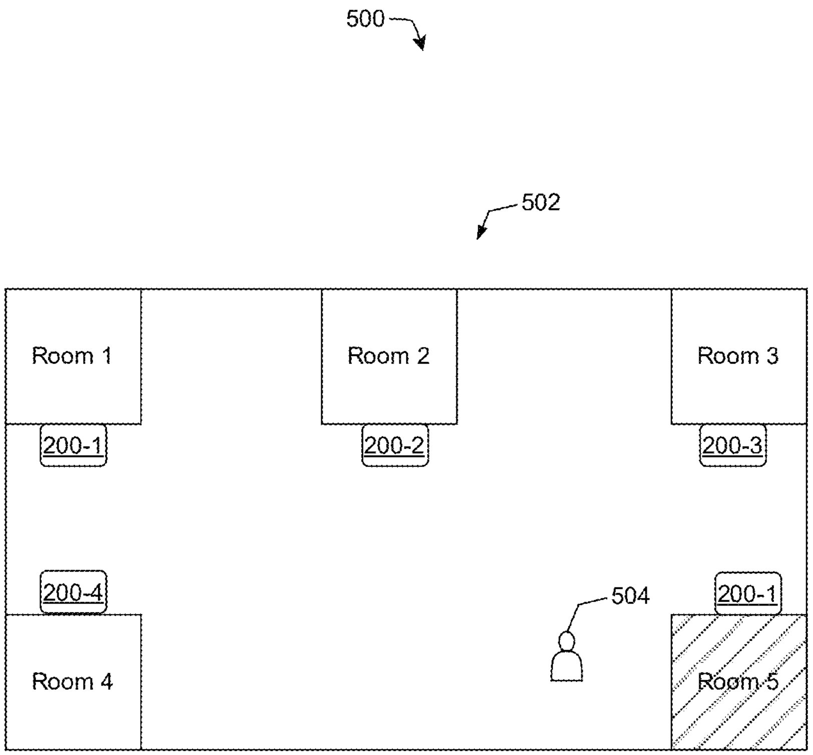
FIG. 5 illustrates a use case depicting implementation of the location aware access system, according to one or more embodiments of the present disclosure.

FIG. 5 illustrates a use case 500 depicting implementation of the system 100, according to some embodiments of the present disclosure. The use case 500 illustrates an environment which includes a geolocation 502 having rooms 1 to 5. In an example, the system 100 may be implemented in the lock 200 which is installed in each of the rooms 1 to 5 as corresponding locks 200. In an example, a user 504 may have permission to access to the rooms 1 to 4 at the geolocation 502, however, the user 504 may not have access to the room 5.

As illustrated in the figure, in a malicious attempt, the lock on the room 5 is either replaced with the lock 200-1, or is re-programmed with a cloned copy of the lock 200-1. Now, in such an instance, when an access card is presented by the user 504 to the lock 200-1 for attempting access to the room 5, the lock 200-1 performs an authentication of the card, wherein the access credentials, the corresponding timestamp, and the geolocation is used for authentication. Herein, the authentication includes the step of comparing and verifying a geolocation of the reader 102 based on the reader-location database, as described above in FIG. 1.

In the use case 500, the access credentials and the timestamp of the user 504 may pass the authentication check. However, since the lock 200-1 is now at geolocation of room 5 and not at the geolocation of room 1, the location of the reader 102 is room 5 and not room 1. Accordingly, when the lock 200-1 compares the room 5 geolocation with the set of authorized geolocation, which includes only room 1, for the reader 102, the lock 200-1 detects a mismatch and may deem the authentication as unsuccessful. Accordingly, the user 504 is denied permission to enter the room 5.

Figure 6:
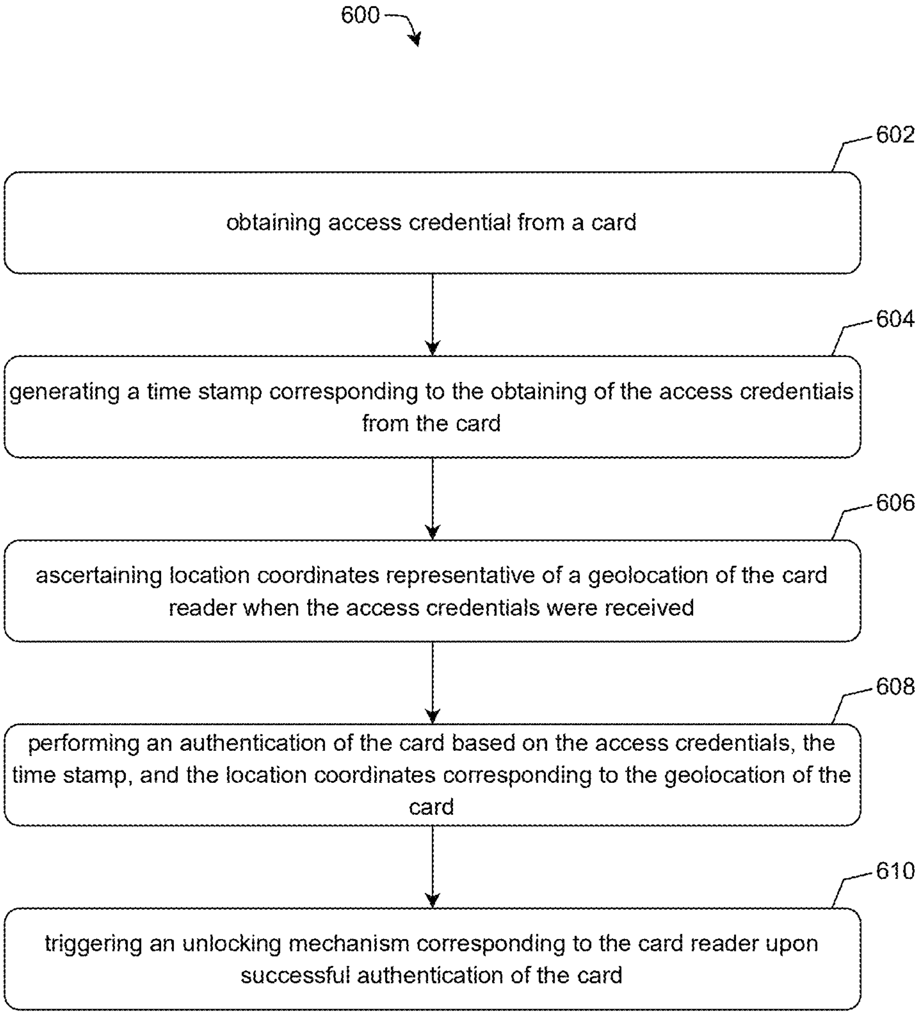
FIG. 6 illustrates a flowchart of an access method implemented in the location aware access system, according to one or more embodiments of the present disclosure.

FIG. 6 illustrates a flowchart of an access method 600 implemented in a location aware access system, such as the system 100, according to one or more embodiments of the present disclosure. The steps of the method 600, described in connection with the embodiments disclosed herein, may be embodied directly in hardware, in firmware, in a software module executed by the system 100, or in any practical combination thereof.

At step 602, access credentials from a card are obtained. In some examples, the reader 102 may obtain the access credentials from the card when the card is within a predetermined distance of the reader 102. The card, in some examples, may be a physical card issued to a user of the card. In some examples, the card may be a digital card and may be issued to a registered user device of the user. The access credentials may be received from the card, using one or more communication technologies, such as RFID, NFC, Bluetooth, Wi-Fi, etc., implemented by the reader 102. In some examples, the obtaining may include swiping the card in a magnetic head provided in the reader 102.

For example, Employee A approaches the entrance of her office building and presents her physical RFID card to the reader 102 on the lock 200. The reader 102 detects the card within the specified NFC range of less than five centimeters and retrieves Employee A's unique access credentials embedded in the card's RFID chip. Alternatively, if Employee A uses a digital card stored on her smartphone, she may use Bluetooth to transmit her access credentials to the reader 102 when her phone is within the Bluetooth range of 1-5 meters from the lock 200.

At step 604, a time stamp corresponding to the obtaining of the access credentials from the card is generated. In an example, the reader 102 may generate the timestamp corresponding to the time instant when the access credentials were obtained from the card. The timestamp may be generated using an internal clock circuitry of the reader 102 and may be stored in an internal memory of the card reader.

Continuing the example, once Employee A's card is detected and the access credentials are obtained, the reader 102 records the exact time of this interaction using its internal clock circuitry. This timestamp is then stored within the lock 200's internal memory, marking the moment Employee A attempted to access the building. For instance, if Employee A presents her card at 8:45 AM, the timestamp "08:45:00" is recorded and associated with her access attempt.

At step 606, location coordinates representative of a geolocation of the card reader when the access credentials were received are ascertained. In some examples, one or more of the various communication modules provided in the reader 102 may be used for ascertaining the location coordinates. For instance, in an example, the Wi-Fi module may be used for ascertaining the location coordinates. Herein, the Wi-Fi unit performs a scan and detects one or more access points and their corresponding signal strengths. Based on the signal strengths, the reader 102 may determine the access point closest to the reader 102 and accordingly may select the location of the access points as its geolocation.

For example, at the time Employee A's card is read, the lock 200 initiates a Wi-Fi scan. It detects several access points within the vicinity, identifying the strongest signal as coming from the building's main entrance Wi-Fi access point. The lock 200 uses this information to ascertain its location as the main entrance of the office building. Alternatively, if the Wi-Fi signals are weak or unavailable, the GPS module within the reader 102 can determine its location using satellite signals, confirming it is at the main entrance with coordinates.

In another example, the GPS module of the reader 102 may be used for ascertaining the location coordinates of the reader 102. Herein, the GPS module may utilize the signal received from one or more GPS satellites for ascertaining the location coordinates of the reader 102. In yet another example, the reader 102 may request the user device of the user for sharing location data. In said example, the reader 102 may transmit a location request to the user device, requesting for the location coordinates. The user device may ascertain the location coordinates and may accordingly provide a location response including the location coordinates to the reader 102. In some examples, one or more of the aforementioned techniques may be implemented in order to ascertain the location coordinates of the reader 102.

Continuing the example, if the Wi-Fi scan is inconclusive due to signal interference, the lock 200 switches to its internal GPS module, which triangulates the location using satellite signals to confirm it is at the main entrance. Alternatively, if Employee A's smartphone has the digital card and is in proximity, the lock 200 might send a request to her smartphone, which then provides its current GPS coordinates, confirming the lock's location. For instance, Employee A's phone could respond with the location information.

In some examples, the reader 102 may provide the access credentials, the corresponding timestamp, and the geolocation of the reader 102 corresponding to the time instant of obtaining of the access credentials, to the controller 112. The providing may be achieved by way of direct communication, in an example. In another example, the reader 102 may communicate with the controller 112 using access points, such as gateways, etc.

For example, after successfully obtaining the access credentials, timestamp, and geolocation, the reader 102 communicates this data to the controller 112. This communication may occur directly via a wired connection within the building's security system, or wirelessly through the building's Wi-Fi network, ensuring that all necessary data for authentication is promptly transmitted to the controller 112. The controller 112 then uses this data to begin the authentication process.

At step 608, an authentication of the card is performed based on the access credentials, the time stamp, and the location coordinates corresponding to the geolocation of the card. In some examples, the controller 112 may access a card database in a storage to check whether the access credentials match a record in the card database or not. The card database, in an example, may include a plurality of records corresponding to a plurality of authorized cards. Each record may include access credentials, permissible access time period, and a set of permissible geolocations corresponding to an authorized card.

For example, the controller 112 receives Employee A's access credentials, timestamp, and geolocation from the reader 102. It then accesses the card database stored in the system's storage 114, finding Employee A's card details. The controller checks that Employee A's access credentials are valid, confirms that the timestamp falls within her permitted access hours (e.g., 8 AM to 6 PM), and verifies that the geolocation matches the office building's main entrance. In another scenario, Employee A might present her card at a restricted area within the building at 9:00 PM, outside her authorized access hours. The controller 112 would find that either the time or location does not match her permissible access data and deny the authentication.

If the access credentials match the access credentials stored against a record stored in the card database, the card is deemed as an authorized card. Furthermore, a determination is made as to whether the time stamp is within the permissible access time period corresponding to the authorized card. Yet further, a determination is made as to whether the geolocation corresponding to the location coordinates matches with a geolocation in the set of permissible geolocations corresponding to the authorized card. When the time stamp is within the permissible access time period corresponding to the authorized card and the geolocation corresponding to the location coordinates matches with a geolocation in the set of permissible geolocations corresponding to the authorized card, the authentication is deemed successful.

For example, the controller 112 confirms that Employee A's access credentials match her authorized card details in the database. It verifies that the timestamp is within her allowed access hours and that the location coordinates correspond to the authorized entry point. Consequently, the system determines that Employee A's authentication is successful. If any of these parameters do not match, the system will deem the authentication as unsuccessful and deny access.

At step 610, an unlocking mechanism in triggered a lock corresponding to the card reader, upon successful authentication of the card. The controller 112 may send a communication signal to the lock for unlocking of the lock, when the authentication is determined as successful.

Following successful authentication, the controller 112 sends a signal to the locking mechanism of the door at the main entrance. The lock 200 then disengages, allowing Employee A to open the door and enter the building, ensuring secure and verified access based on her credentials, the timestamp, and the geolocation. For example, at 8:46 AM, after confirming all authentication criteria, the lock 200 clicks open, and Employee A is able to enter the office building smoothly.

Figure 7:
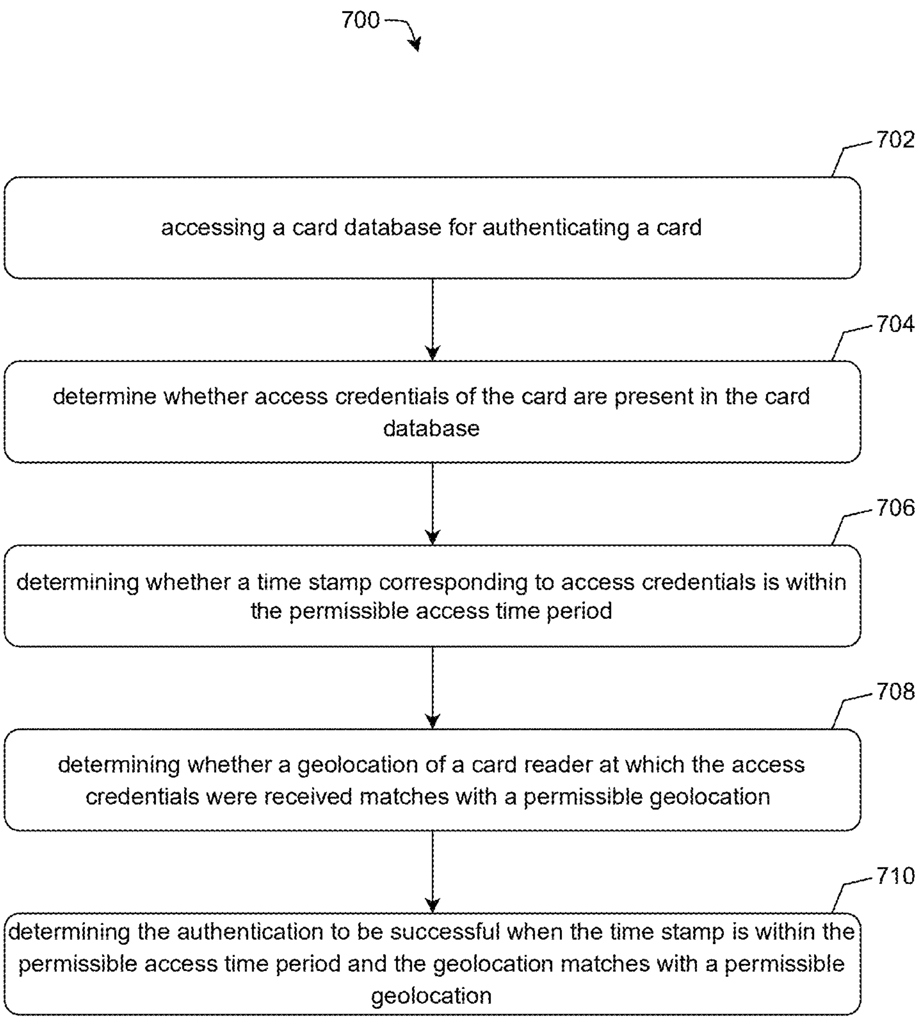
FIG. 7 illustrates a flowchart of a method of authenticating a card in the location aware access system, according to one or more embodiments of the present disclosure.

FIG. 7 illustrates a method 700 of authenticating a card in a location aware access system, such as the system 100, according to one or more embodiments of the present disclosure. The steps of the method 700, described in connection with the embodiments disclosed herein, may be embodied directly in hardware, in firmware, in a software module executed by the system 100, or in any practical combination thereof.

At step 702, a card database is accessed for authenticating a card. In an example, the card database may be present in the storage 114. The card database, in some examples, may include a plurality of records of authorized cards. For instance, each record may include access credentials of a user to whom the card was issued, a permissible access time period within which the usage of the card would be considered as valid, and a set of geolocations at which the card would be considered valid. In some examples, the controller 112 may access the card database for authenticating the card.

At step 704, it is determined whether access credentials corresponding to the card are stored in a record of the card database. In some example, the controller 112 may run a query in the card database using the received access credentials. If a successful match is found in a record in the card database, the card may be deemed as an authorized card.

At step 706, it is determined whether a timestamp at which the access credentials were received is within a permissible access period corresponding to the authorized card. In some examples, the controller 112 may make the aforesaid determination based on the permissible access time period corresponding to the authorized card as stored in the record. If the timestamp is within the permissible access time period, the timestamp is determined to be within the permissible access time period.

At step 708, it is determined whether a geolocation of the reader at the instant at which the access credentials were received is matching any of the corresponding geolocations stored for the card in the card database. In other words, the captured geolocation of the reader which corresponds to the user's location at the time of access is used to determine whether the user is attempting access at a permitted geolocation or not. In some examples, when the controller 112 find the geolocation of the reader to be present in the record of the authorized card, the controller 112 determines that the geolocation matches the stored geolocation.

In some embodiments, a further step of authentication may be performed in which it is determined whether the reader is present at a designated location or not. This is performed to further verify the installed location of the reader and avoid instances of cloning or malicious re-installations of the reader to gain access to environments. In an implementation, the geolocation of the reader is queried to a reader-location database. The reader-location database includes a plurality of reader identities mapped with a plurality of geolocations. In case the geolocation of the reader matches a stored geolocation for the reader in a reader-location database, the authentication is deemed successful.

FIG. 8 is a schematic representation of a card database 800 used in a location-aware access system, such as the system 100, according to one or more embodiments of the present disclosure. The card database 800 stores the access credentials, access levels, permissible access time periods, and permissible geolocations associated with various cards issued to users. The data stored in the card database 800 is used during the authentication process carried out by the system 100 to determine whether to permit or deny access to users based on the presented cards.

Each entry in the card database 800 corresponds to a unique card issued to a user and includes several fields. For instance, the Card ID is a unique identifier assigned to each card in the database. For example, Card ID 1 is assigned to a card with access credentials A123. The Access Credentials field contains the unique access codes or identifiers stored on the card. These credentials are used by the reader 102 to identify the card during an access attempt. For example, the card with Card ID 1 has access credentials A123.

The Access Levels field specifies the level of access granted to the cardholder. Different access levels may correspond to varying degrees of access permissions within the environment. For instance, Access Level 1 may grant basic access, whereas Access Level 3 may grant more comprehensive access rights. As an example, the card with Card ID 3 is assigned Access Level 3.

The Permissible Access Time Period defines the time frame within which the cardholder is allowed access. This field ensures that access is restricted to certain hours of the day. For example, the card with Card ID 2 is permitted access from 8:00 AM to 6:00 PM.

The Permissible Geolocations field lists the specific locations where the cardholder is authorized to access. This ensures that even if a cardholder has valid access credentials and is within the permissible time period, access will only be granted at certain predefined locations. For example, the card with Card ID 4 is permitted access to Location A and Location D.

In operation, when a user presents their card to the reader 102, the system 100 obtains the access credentials from the card and queries the card database 800 to find a matching record. The system then checks the corresponding access level, permissible access time period, and permissible geolocations associated with the card to authenticate the user's access request.

For example, if Employee A presents a card with Card ID 1 (access credentials A123) at Location A at 10:00 AM, the system 100 will verify that the access credentials (A123) match the entry for Card ID 1, the access level is Level 1, the current time (10:00 AM) falls within the permissible access time period (9:00 AM-5:00 PM), and the attempted access is at one of the permissible geolocations (Location A). Upon confirming all the conditions are met, the system 100 will grant access to Employee A.

In another example, if Employee A attempts to use the same card at Location B at 4:00 PM, the system 100 will deny access because Location B is not listed as a permissible geolocation for Card ID 1, despite the access credentials and time period being valid.

FIG. 9 is a schematic representation of a reader-location database 900 used in a location-aware access system, such as the system 100, according to one or more embodiments of the present disclosure. The reader-location database 900 stores information related to the various readers deployed in the environment, including their unique identifiers and corresponding geolocations. The data stored in the reader-location database 900 is utilized by the system 100 to verify the geolocation of the reader 102 when access credentials are obtained from a card. The reader-location database 900 is structured in a tabular format as depicted in the FIG. 9.

Each entry in the reader-location database 900 corresponds to a unique reader installed in the environment and includes several fields. For instance, the Reader ID is a unique identifier assigned to each reader in the database. This ID is used to uniquely identify each reader during the authentication process. For example, Reader ID R001 is assigned to a reader located at Location A. The Geolocation (s) field specifies the precise geolocation or set of geolocations where the reader is installed. This ensures that each reader's location is accurately known and can be cross-referenced during the access authentication process. For instance, Reader ID R005 is associated with multiple locations, specifically Locations A, B, and C.

In operation, when a user presents their card to the reader 102, the system 100 not only obtains the access credentials from the card but also identifies the Reader ID and retrieves the corresponding geolocation(s) from the reader-location database 900. This information is used in conjunction with the access credentials and permissible geolocations stored in the card database 800 to authenticate the user's access request.

For example, if Employee A presents a card to Reader ID R001, the system 100 will verify that the Reader ID (R001) corresponds to Location A, the access credentials obtained from the card match a record in the card database 800, and that the permissible geolocations associated with the access credentials include Location A. If all conditions are met, the system 100 will grant access.

In another example, if Employee A attempts to use the same card at Reader ID R002, which corresponds to Location B, the system 100 will deny access if Location B is not listed as a permissible geolocation for the card's access credentials, even if the other conditions (such as access credentials and time period) are valid.

Aspects of the present disclosure offer advantageous solutions by enhancing the security, efficiency, and flexibility of access control systems. By incorporating geolocation and timestamp data into the authentication process, the system ensures that access is granted only at specific locations and within designated time periods. This multi-factor authentication approach substantially reduces the risk of unauthorized access. This added layer of security is particularly valuable in environments requiring high levels of protection, such as corporate campuses, government facilities, and secure transportation systems.

Additionally, the system's ability to use different communication technologies (NFC, RFID, Bluetooth, Wi-Fi) for obtaining access credentials ensures compatibility with a wide range of devices and cards, further enhancing its adaptability and ease of deployment.

The connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A location aware access system, comprising:

a card reader; and at least one controller, wherein the card reader is configured to:

obtain access credential from a card;

generate a time stamp corresponding to the obtaining of the access credentials from the card;

ascertain location coordinates representative of a geolocation of the card reader when the access credentials were received; and provide the access credentials, the time stamp, and the location coordinates to the at least one controller; and the at least one controller is configured to:

receive, from the card reader, the access credentials, the time stamp, and the location coordinates corresponding to the geolocation of the card reader; and perform authentication of the card based on the access credentials, the time stamp, and the location coordinates corresponding to the geolocation of the card; and trigger an unlocking mechanism in a lock corresponding to the card reader, upon successful authentication of the card, wherein the authentication is determined to be successful when the time stamp is within a permissible access time period corresponding to the card and the geolocation of the card matches a set of permissible geolocations corresponding to the card.

2. The system of claim 1, further comprising:

a storage, wherein the storage comprises a card database comprising a plurality of records corresponding to a plurality of authorized cards, wherein each record comprises access credentials, the permissible access time period, and the set of permissible geolocations corresponding to an authorized card; and wherein for performing the authentication of the card, the at least one controller is configured to:

access the storage;

determine the card to be an authorized card when a match for the access credentials is found in a record in the card database;

determine whether the time stamp is within the permissible access time period corresponding to the authorized card; and determine whether the geolocation corresponding to the location coordinates matches with a geolocation in the set of permissible geolocations corresponding to the authorized card.

3. The system of claim 2, wherein the storage further comprises a reader-location database, wherein the reader-location database comprises a plurality of geolocations corresponding to a plurality of card readers, wherein the at least one controller is further configured to:

determine whether the geolocation corresponding to the received location coordinates matches with a stored geolocation corresponding to the card reader in the reader-location database; and determine the authentication to be successful when the geolocation corresponding to the location coordinates matches with the stored geolocation corresponding to the card reader.

4. The system of claim 1, further comprising at least one communication unit from a group of: GPS unit, a Wi-Fi unit, a Bluetooth unit, and RFID/NFC unit, and wherein the at least one communication unit is configured to:

perform a scan to discover one or more access points; and determine the location coordinates based on the one or more access points discovered during the scan.

5. The system of claim 1, further comprising at least one communication unit from a group of: GPS unit, a Wi-Fi unit, a Bluetooth unit, and RFID/NFC unit, wherein the card is a digital card stored in a user device, and wherein the at least one communication unit is configured to:

transmit a location request to the user device; and receive a location response from the user device, the location response comprising the location coordinates.

6. The system of claim 1, further comprising at least one communication unit from a group of: GPS unit, a Wi-Fi unit, a Bluetooth unit, and RFID/NFC unit, wherein the at least one communication unit is configured to determine the location coordinates using global positioning system technology.

7. The system of claim 1, wherein the card reader is configured to obtain the access credentials from the card when the card is within a predetermined distance from the card reader.

8. An access method implemented in a location aware access system, the method comprising:

obtaining, by a card reader, access credential from a card;

generating, by the card reader, a time stamp corresponding to the obtaining of the access credentials from the card;

ascertaining, by the card reader, location coordinates representative of a geolocation of the card reader when the access credentials were received;

performing, by at least one controller, an authentication of the card based on the access credentials, the time stamp, and the location coordinates corresponding to the geolocation of the card; and triggering, by the at least one controller, an unlocking mechanism in a lock corresponding to the card reader, upon successful authentication of the card, wherein the authentication is determined to be successful when the time stamp is within a permissible access time period corresponding to the card and the geolocation of the card matches a set of permissible geolocations corresponding to the card.

9. The method of claim 8, further comprising:

accessing, by the at least one controller, a storage, wherein the storage comprises a card database comprising a plurality of records corresponding to a plurality of authorized cards, wherein each record comprises access credentials, the permissible access time period, and the set of permissible geolocations corresponding to an authorized card;

determining the card to be an authorized card when a match for the access credentials is found in a record in the card database;

determining whether the time stamp is within the permissible access time period corresponding to the authorized card; and determining whether the geolocation corresponding to the location coordinates matches with a geolocation in the set of permissible geolocations corresponding to the authorized card.

10. The method of claim 9, wherein the storage further comprising a reader-location database, wherein the reader-location database comprises a plurality of geolocations corresponding to a plurality of card readers, the method further comprising:

determining, by the at least one controller, whether the geolocation corresponding to the received location coordinates matches with a stored geolocation corresponding to the card reader in the reader-location database; and determining the authentication to be successful when the geolocation corresponding to the location coordinates matches with the stored geolocation corresponding to the card reader.

11. The method of claim 8, wherein the system further comprises at least one communication unit from a group of: GPS unit, a Wi-Fi unit, a Bluetooth unit, and RFID/NFC unit, the method further comprising:

performing, using the at least one communication unit, a scan to discover one or more access points; and determining the location coordinates based on the one or more access points discovered during the scan.

12. The method of claim 8, wherein the system further comprises at least one communication unit from a group of: GPS unit, a Wi-Fi unit, a Bluetooth unit, and RFID/NFC unit, and wherein the card is a digital card stored in a user device, the method further comprising:

transmitting, by the at least one communication unit, a location request to the user device; and receiving a location response from the user device, the location response comprising the location coordinates.

13. The method of claim 8, wherein the system further comprises at least one communication unit from a group of: GPS unit, a Wi-Fi unit, a Bluetooth unit, and RFID/NFC unit, the method further comprising, determining, by the at least one communication unit, the location coordinates using global positioning system technology.

14. The method of claim 8, further comprising obtaining, by the card reader, the access credentials from the card when the card is within a predetermined distance from the card reader.

15. A computer-readable medium having computer-executable instructions stored thereon that, when executed by a processing system, cause the processing system to:

obtain, using a card reader, access credential from a card;

generate a time stamp corresponding to the obtaining of the access credentials from the card;

ascertain location coordinates representative of a geolocation of the card reader when the access credentials were received;

perform, using at least one controller, an authentication of the card based on the access credentials, the time stamp, and the location coordinates corresponding to the geolocation of the card; and trigger an unlocking mechanism in a lock corresponding to the card reader, upon successful authentication of the card, wherein the authentication is determined to be successful when the time stamp is within a permissible access time period corresponding to the card and the geolocation of the card matches a set of permissible geolocations corresponding to the card.

16. The computer-readable medium of claim 15, wherein the computer-executable instructions cause the processing system to:

access a storage, wherein the storage comprises a card database comprising a plurality of records corresponding to a plurality of authorized cards, wherein each record comprises access credentials, the permissible access time period, and the set of permissible geolocations corresponding to an authorized card;

determine the card to be an authorized card when a match for the access credentials is found in a record in the card database;

determine whether the time stamp is within the permissible access time period corresponding to the authorized card; and determine whether the geolocation corresponding to the location coordinates matches with a geolocation in the set of permissible geolocations corresponding to the authorized card.

17. The computer-readable medium of claim 16, wherein the storage further comprises a reader-location database, wherein the reader-location database comprises a plurality of geolocations corresponding to a plurality of card readers, wherein the computer-executable instructions cause the processing system to:

determine whether the geolocation corresponding to the received location coordinates matches with a stored geolocation corresponding to the card reader in the reader-location database; and determine the authentication to be successful when the geolocation corresponding to the location coordinates matches with the stored geolocation corresponding to the card reader.

18. The computer-readable medium of claim 15, wherein the computer-executable instructions cause the processing system to:

perform, using at least one communication unit, a scan to discover one or more access points; and determine the location coordinates based on the one or more access points discovered during the scan.

19. The computer-readable medium of claim 15, wherein the card is a digital card stored in a user device, the computer-executable instructions cause the processing system to:

transmit a location request to the user device; and receive the location response comprising the location coordinates.

20. The computer-readable medium of claim 15, wherein the computer-executable instructions cause the processing system to obtain the access credentials from the card when the card is within a predetermined distance from the card reader.

* * * * *